United States Patent
Igari

(10) Patent No.: US 11,912,259 B2
(45) Date of Patent: Feb. 27, 2024

(54) CONTROLLER AND CONTROL METHOD FOR BRAKING IN AN ADAPTIVE CRUISE CONTROL

(71) Applicant: Robert Bosch GmbH, Stuttgart (DE)

(72) Inventor: Yoshihide Igari, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/619,071

(22) PCT Filed: May 29, 2020

(86) PCT No.: PCT/IB2020/055121
§ 371 (c)(1),
(2) Date: Dec. 14, 2021

(87) PCT Pub. No.: WO2020/254897
PCT Pub. Date: Dec. 24, 2020

(65) Prior Publication Data
US 2022/0410854 A1    Dec. 29, 2022

(30) Foreign Application Priority Data
Jun. 19, 2019 (JP) .................................. 2019-113691

(51) Int. Cl.
*B60T 8/1766* (2006.01)
*B60T 8/17* (2006.01)
(Continued)

(52) U.S. Cl.
CPC .......... *B60T 8/1766* (2013.01); *B60T 8/1706* (2013.01); *B60T 8/1761* (2013.01); *B60W 10/18* (2013.01);
(Continued)

(58) Field of Classification Search
CPC .... B60T 8/1766; B60T 8/1706; B60T 8/1761; B60T 2201/02; B60T 2230/03;
(Continued)

(56) References Cited

U.S. PATENT DOCUMENTS 5,774,821 A * 6/1998 Eckert ................ B60W 40/064
701/72
6,371,890 B1 * 4/2002 Schell .................. B60W 10/06
477/209
(Continued)

FOREIGN PATENT DOCUMENTS

JP  2009116882 A   5/2009
WO 2018172870 A1  9/2018
(Continued)

OTHER PUBLICATIONS

Seiniger et al., Perspectives for Motorcycle Stability Control Systems, 2012, Elsevier, Accident Analysis and Prevention 44, pp. 74-81 (Year: 2012).*

(Continued)

*Primary Examiner* — Sze-Hon Kong
(74) *Attorney, Agent, or Firm* — Michael Best & Friedrich LLP

(57) ABSTRACT

The present invention obtains a controller and a control method capable of appropriately executing adaptive cruise control of a straddle-type vehicle.
In the controller and the control method according to the present invention, when braking forces are generated on at least one of wheels of the straddle-type vehicle during the adaptive cruise control, in which the straddle-type vehicle is made to travel according to a distance from the straddle-type vehicle to a preceding vehicle, motion of the straddle-type vehicle, and a rider's instruction, at a braking start time point at which the braking force starts being generated on at least one of the wheels, braking force distribution between the (Continued)

front and the rear wheel is brought into an initial state where the braking force is generated on the front wheel.

12 Claims, 4 Drawing Sheets

(51) Int. Cl.
    *B60T 8/1761*     (2006.01)
    *B60W 10/18*     (2012.01)
    *B60W 30/16*     (2020.01)
    *B60W 40/10*     (2012.01)

(52) U.S. Cl.
    CPC ............ *B60W 30/16* (2013.01); *B60W 40/10* (2013.01); *B60T 2201/02* (2013.01); *B60W 2300/36* (2013.01); *B60W 2520/16* (2013.01); *B60W 2520/26* (2013.01); *B60W 2540/223* (2020.02)

(58) Field of Classification Search
    CPC ...... B60W 10/18; B60W 30/16; B60W 40/10; B60W 2300/36; B60W 2520/16; B60W 2520/26; B60W 2540/223; B60W 30/14; B62L 3/08
    See application file for complete search history.

(56) References Cited

U.S. PATENT DOCUMENTS

| | | | |
|---|---|---|---|
| 2012/0205968 A1* | 8/2012 | Takenouchi | B60T 8/261 303/9.64 |
| 2013/0030649 A1* | 1/2013 | Matsuda | B60T 8/3225 701/38 |
| 2014/0324311 A1* | 10/2014 | Hagenlocher | B60T 8/1755 701/70 |
| 2017/0101081 A1* | 4/2017 | Meier | B60T 8/1766 |
| 2018/0201248 A1* | 7/2018 | Kaneta | B60T 13/18 |
| 2019/0135248 A1* | 5/2019 | Iizuka | B60T 8/1706 |
| 2019/0300012 A1* | 10/2019 | Tsukada | B60T 8/1766 |
| 2020/0156573 A1* | 5/2020 | Kawada | B60W 40/09 |
| 2020/0171946 A1* | 6/2020 | Matsuda | B60W 30/045 |
| 2020/0369158 A1* | 11/2020 | Marx | B60L 7/26 |
| 2020/0407000 A1* | 12/2020 | Kaita | B62J 17/04 |
| 2021/0197816 A1* | 7/2021 | Horn | B62J 50/22 |
| 2022/0073038 A1* | 3/2022 | Suzuki | F16D 65/18 |
| 2022/0169239 A1* | 6/2022 | Nose | B60W 10/18 |

FOREIGN PATENT DOCUMENTS

WO     2018185578 A1     10/2018
WO     2019025886 A1     2/2019

OTHER PUBLICATIONS

International Search Report and Written Opinion for Application No. PCT/IB2020/055121 dated Sep. 9, 2020 (9 pages).

\* cited by examiner

CONTROLLER AND CONTROL METHOD FOR BRAKING IN AN ADAPTIVE CRUISE CONTROL

BACKGROUND OF THE INVENTION

The present disclosure relates to a controller and a control method capable of appropriately executing adaptive cruise control for a straddle-type vehicle.

As a conventional technique related to a straddle-type vehicle, a technique of assisting with a rider's operation is available.

For example, a driver assistance system is disclosed in JP-A-2009-116882. Based on information detected by a sensor that detects an obstacle present in a travel direction or substantially in the travel direction, the driver assistance system warns a motorcycle rider that the motorcycle inappropriately approaches the obstacle.

SUMMARY OF THE INVENTION

By the way, as a technique of assisting with the rider's operation, it is considered to apply adaptive cruise control, in which a vehicle is made to travel according to a distance from the vehicle to a preceding vehicle, motion of the vehicle, and the rider's instruction, to the straddle-type vehicle such as the motorcycle. The straddle-type vehicle tends to have an unstable posture in comparison with a four-wheeled vehicle, for example. Accordingly, the straddle-type vehicle exhibits behavior unintended by the rider due to automatic exertion of a braking force to the straddle-type vehicle during the adaptive cruise control of the straddle-type vehicle, which possibly worsens the rider's comfort. The rider's comfort can be improved by braking the straddle-type vehicle such that the braking force is only generated to a rear wheel. However, in such a case, braking efficiency possibly worsens as a force remains in a front-wheel brake mechanism that is more favorable for braking of the straddle-type vehicle than a rear-wheel brake mechanism.

The present invention has been made in view of the above-described problem, and therefore obtains a controller and a control method capable of appropriately executing adaptive cruise control for a straddle-type vehicle.

A controller according to the present invention is a controller that controls travel of a straddle-type vehicle, and includes an execution section capable of executing adaptive cruise control in which the straddle-type vehicle is made to travel according to a distance from the straddle-type vehicle to a preceding vehicle, motion of the straddle-type vehicle, and a rider's instruction. When the execution section causes generation of braking forces on at least one of wheels of the straddle-type vehicle during the adaptive cruise control, at a braking start time point at which the braking force starts being generated on at least one of the wheels, the execution section brings braking force distribution between a front wheel and a rear wheel into an initial state where the braking force is generated on the front wheel.

A control method according to the present invention is a control method for controlling travel of a straddle-type vehicle. In the control method, when a controller causes generation of braking forces on at least one of wheels of the straddle-type vehicle during adaptive cruise control, in which the straddle-type vehicle is made to travel according to a distance from the straddle-type vehicle to a preceding vehicle, motion of the straddle-type vehicle, and a rider's instruction, at a braking start time point at which the braking force starts being generated on at least one of the wheels, braking force distribution between a front wheel and a rear wheel is brought into an initial state where the braking force is generated on the front wheel.

Advantageous Effects of Invention

In the controller and the control method according to the present invention, when braking forces are generated on at least one of wheels of the straddle-type vehicle during the adaptive cruise control, in which the straddle-type vehicle is made to travel according to the distance from the straddle-type vehicle to the preceding vehicle, the motion of the straddle-type vehicle, and the rider's instruction, at the braking start time point at which the braking force starts being generated on at least one of the wheels, the braking force distribution between the front and rear wheels is brought into the initial state where the braking force is generated on the front wheel. As a result, at the braking start time point, it is possible to prevent generation of a force remaining in a brake mechanism for the front wheel that is more favorable for braking of the straddle-type vehicle than a brake mechanism for the rear wheel. Therefore, the adaptive cruise control of the straddle-type vehicle can appropriately be executed.

DETAILED DESCRIPTION

Figure 1:
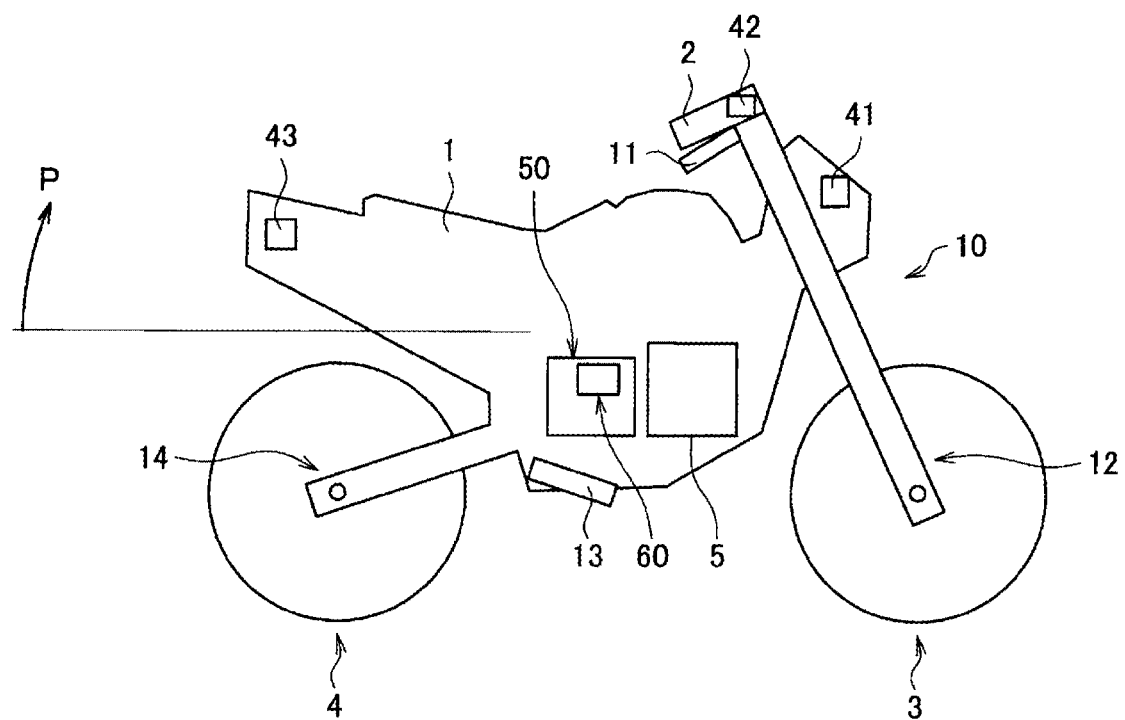
FIG. 1 is a schematic view of an outline configuration of a motorcycle to which a controller according to an embodiment of the present invention is mounted.

A description will hereinafter be made on a controller according to the present invention with reference to the drawings. Hereinafter, a description will be made on the controller used for a two-wheeled motorcycle. However, the controller according to the present invention may be used for a straddle-type vehicle other than the two-wheeled motorcycle (for example, a three-wheeled motorcycle, an all-terrain vehicle, a bicycle, or the like). The straddle-type vehicle means a vehicle that a rider straddles. In addition, a description will hereinafter be made on a case where an engine is mounted as a drive source capable of outputting power for driving a wheel of the motorcycle. However, as the drive source for the motorcycle, a drive source other than the engine (for example, a motor) may be mounted, or a plurality of the drive sources may be mounted.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. In addition, a detailed structure will appropriately be illustrated in a simplified manner or will not be illustrated.

<Configuration of Motorcycle>

A description will be made on a configuration of a motorcycle 100 to which a controller 60 according to an embodiment of the present invention is mounted with reference to FIG. 1 to FIG. 3.

FIG. 1 is a schematic view of an outline configuration of the motorcycle 100 to which the controller 60 is mounted. FIG. 2 is a schematic view of an outline configuration of a brake system 10. FIG. 3 is a block diagram of an exemplary functional configuration of the controller 60.

As illustrated in FIG. 1, the motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; an engine 5; and the brake system 10. In this embodiment, the controller (ECU) 60 is provided to a hydraulic pressure control unit 50 in the brake system 10, which will be described later. As illustrated in FIG. 1 and FIG. 2, the motorcycle 100 further includes: an inter-vehicular distance sensor 41, an input device 42, an inertial measurement unit (IMU) 43, a master-cylinder pressure sensor 48, and a wheel-cylinder pressure sensor 49. The motorcycle 100 corresponds to an example of the "straddle-type vehicle" in the present invention.

The engine 5 corresponds to an example of a drive source for the motorcycle 100, and can output power for driving the wheel (more specifically, the rear wheel 4). For example, the engine 5 is provided with: one or multiple cylinders, each of which is formed with a combustion chamber therein; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause a crankshaft to rotate. In addition, a throttle valve is provided to an intake pipe of the engine 5, and an intake air amount for the combustion chamber varies according to a throttle opening amount as an opening degree of the throttle valve.

Figure 2:
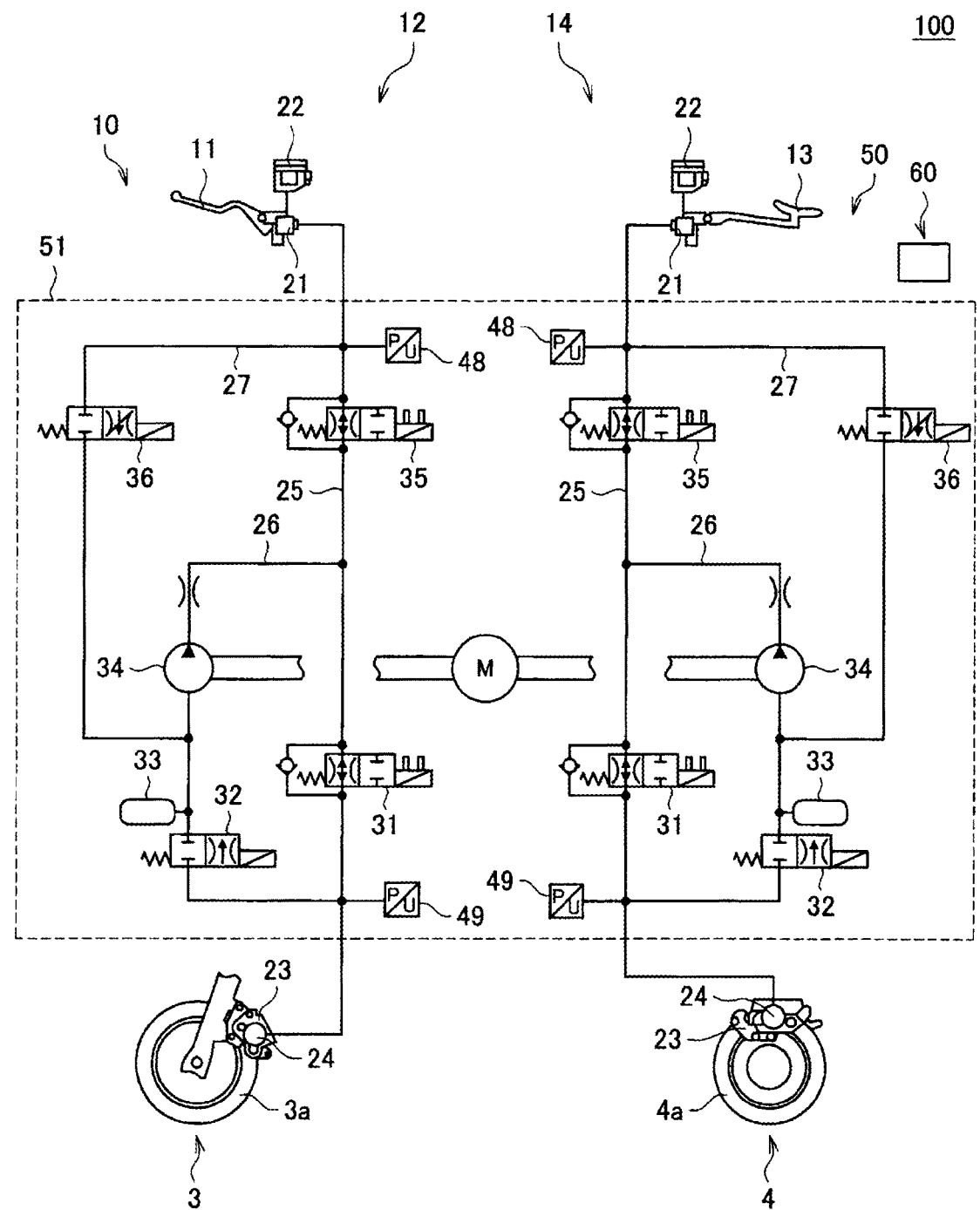
FIG. 2 is a schematic view of an outline configuration of a brake system according to the embodiment of the present invention.

As illustrated in FIG. 1 and FIG. 2, the brake system 10 includes: a first brake operation section 11; a front-wheel brake mechanism 12 that brakes the front wheel 3 in an interlocking manner with at least the first brake operation section 11; a second brake operation section 13; and a rear-wheel brake mechanism 14 that brakes the rear wheel 4 in an interlocking manner with at least the second brake operation section 13. The brake system 10 also includes the hydraulic pressure control unit 50, and the front-wheel brake mechanism 12 and the rear-wheel brake mechanism 14 are partially included in the hydraulic pressure control unit 50. The hydraulic pressure control unit 50 is a unit that has a function of controlling a braking force to be generated on the front wheel 3 by the front-wheel brake mechanism 12 and a braking force to be generated on the rear wheel 4 by the rear-wheel brake mechanism 14.

The first brake operation section 11 is provided to the handlebar 2 and is operated by the rider's hand. The first brake operation section 11 is a brake lever, for example. The second brake operation section 13 is provided to a lower portion of the trunk 1 and is operated by the rider's foot. The second brake operation section 13 is a brake pedal, for example.

Each of the front-wheel brake mechanism 12 and the rear-wheel brake mechanism. 14 includes: a master cylinder 21 in which a piston (not illustrated) is installed; a reservoir 22 that is attached to the master cylinder 21; a brake caliper 23 that is held by the trunk 1 and has a brake pad (not illustrated); a wheel cylinder 24 that is provided to the brake caliper 23; a primary channel 25 through which a brake fluid in the master cylinder 21 flows into the wheel cylinder 24; a secondary channel 26 through which the brake fluid in the wheel cylinder 24 is released; and a supply channel 27 through which the brake fluid in the master cylinder 21 is supplied to the secondary channel 26.

An inlet valve (EV) 31 is provided to the primary channel 25. The secondary channel 26 bypasses a portion of the primary channel 25 between the wheel cylinder 24 side and the master cylinder 21 side from the inlet valve 31. The secondary channel 26 is sequentially provided with an outlet valve (AV) 32, an accumulator 33, and a pump 34 from an upstream side. Between an end of the primary channel 25 on the master cylinder 21 side and a portion of the primary channel 25 to which a downstream end of the secondary channel 26 is connected, a first valve (USV) 35 is provided. The supply channel 27 communicates between the master cylinder 21 and a portion of the secondary channel 26 on a suction side of the pump 34. A second valve (HSV) 36 is provided to the supply channel 27.

The inlet valve 31 is an electromagnetic valve that is opened in an unenergized state and closed in an energized state, for example. The outlet valve 32 is an electromagnetic valve that is closed in an unenergized state and opened in an energized state, for example. The first valve 35 is an electromagnetic valve that is opened in an unenergized state and is closed in an energized state, for example. The second valve 36 is an electromagnetic valve that is closed in an unenergized state and is opened in an energized state, for example.

The hydraulic pressure control unit 50 includes: components such as the inlet valves 31, the outlet valves 32, the accumulators 33, the pumps 34, the first valves 35, and the second valves 36 used to control a brake hydraulic pressure; a base body 51 to which those components are provided and channels constituting the primary channels 25, the secondary channels 26, and the supply channels 27 are formed; and the controller 60.

The base body 51 may be formed of one member or may be formed of multiple members. In the case where the base body 51 is formed of the multiple members, the components may separately be provided to the different members.

The controller 60 controls operation of each of the components of the hydraulic pressure control unit 50. As a result, the braking force to be generated on the front wheel 3 by the front-wheel brake mechanism 12 and the braking force to be generated on the rear wheel 4 by the rear-wheel brake mechanism 14 are controlled.

For example, in a normal time (that is, when none of adaptive cruise control and anti-lock brake control, which will be described later, is executed), the controller 60 opens the inlet valves 31, closes the outlet valves 32, opens the first valves 35, and closes the second valves 36. When the first brake operation section 11 is operated in such a state, in the front-wheel brake mechanism 12, the piston (not illustrated) in the master cylinder 21 is pressed to increase a hydraulic pressure of the brake fluid in the wheel cylinder 24, the brake pad (not illustrated) of the brake caliper 23 is then pressed against a rotor 3a of the front wheel 3, and the braking force is thereby generated on the front wheel 3. Meanwhile, when the second brake operation section 13 is operated, in the rear-wheel brake mechanism 14, the piston (not illustrated) in the master cylinder 21 is pressed to increase the hydraulic pressure of the brake fluid in the wheel cylinder 24, the brake pad (not illustrated) of the brake caliper 23 is then pressed against a rotor 4a of the rear wheel 4, and the braking force is thereby generated on the rear wheel 4.

The inter-vehicular distance sensor 41 detects a distance from the motorcycle 100 to a preceding vehicle. The inter-vehicular distance sensor 41 may detect another physical quantity that can substantially be converted to the distance from the motorcycle 100 to the preceding vehicle. Here, the preceding vehicle means a vehicle ahead of the motorcycle 100 and may include, in addition to the nearest vehicle from the motorcycle 100 on the same lane as a travel lane of the motorcycle 100, a vehicle ahead of several vehicles in front of the motorcycle 100, a vehicle traveling on an adjacent lane to the travel lane of the motorcycle 100, and the like. For example, in the case where the multiple vehicles exist ahead of the motorcycle 100, based on a track, which is estimated as a travel track of the motorcycle 100, and behavior of each of the multiple vehicles, the inter-vehicular distance sensor 41 selects the preceding vehicle as a detection target of the distance from the motorcycle 100. In this case, the adaptive cruise control, which will be described later, is executed by using a detection result of the distance from the motorcycle 100 to the thus-selected preceding vehicle.

As the inter-vehicular distance sensor 41, for example, a camera that captures an image in front of the motorcycle 100 and a radar that can detect a distance from the motorcycle 100 to a target in front are used. In such a case, for example, the preceding vehicle is recognized by using the image captured by the camera. Then, by using the recognition result of the preceding vehicle and a detection result by the radar, the distance from the motorcycle 100 to the preceding vehicle can be detected. The inter-vehicular distance sensor 41 is provided to a front portion of the trunk 1, for example. Note that the configuration of the inter-vehicular distance sensor 41 is not limited to the above example, and a stereo camera may be used as the inter-vehicular distance sensor 41, for example.

The input device 42 accepts a travel mode selecting operation by the rider, and outputs information on the travel mode selected by the rider. As will be described later, in the motorcycle 100, the controller 60 can execute the adaptive cruise control. The adaptive cruise control is control in which the motorcycle 100 is made to travel according to the distance from the motorcycle 100 to the preceding vehicle, motion of the motorcycle 100, and the rider's instruction. By using the input device 42, the rider can select, as one of the travel modes, a travel mode in which the adaptive cruise control is executed. For example, as the input device 42, a lever, a button, a touchscreen, or the like is used. The input device 42 is provided to the handlebar 2, for example.

The IMU 43 includes a three-axis gyroscope sensor and a three-directional acceleration sensor, and detects a posture of the motorcycle 100. For example, the IMU 43 detects a pitch angle of the motorcycle 100, and outputs a detection result. The IMU 43 may detect another physical quantity that can substantially be converted to the pitch angle of the motorcycle 100. The pitch angle corresponds to an angle that indicates an inclination of the trunk 1 of the motorcycle 100 in a pitch direction (that is, a rotational direction P around a rotation axis along a vehicle width direction illustrated in FIG. 1) with respect to a horizontal direction. The IMU 43 is provided to the trunk 1, for example. Note that, in the motorcycle 100, a sensor only having a function of detecting the pitch angle may be used instead of the IMU 43.

The master-cylinder pressure sensor 48 detects the hydraulic pressure of the brake fluid in the master cylinder 21, and outputs a detection result. The master-cylinder pressure sensor 48 may detect another physical quantity that can substantially be converted to the hydraulic pressure of the brake fluid in the master cylinder 21. The master-cylinder pressure sensor 48 is provided to each of the front-wheel brake mechanism 12 and the rear-wheel brake mechanism 14.

The wheel-cylinder pressure sensor 49 detects the hydraulic pressure of the brake fluid in the wheel cylinder 24, and outputs a detection result. The wheel-cylinder pressure sensor 49 may detect another physical quantity that can substantially be converted to the hydraulic pressure of the brake fluid in the wheel cylinder 24. The wheel-cylinder pressure sensor 49 is provided to each of the front-wheel brake mechanism 12 and the rear-wheel brake mechanism 14.

The controller 60 controls travel of the motorcycle 100.

For example, the controller 60 is partially or entirely constructed of a microcomputer, a microprocessor unit, or the like. Alternatively, the controller 60 may partially or entirely be constructed of a member in which firmware or the like can be updated, or may partially or entirely be a program module or the like that is executed by a command from a CPU or the like, for example. The controller 60 may be provided as one unit or may be divided into multiple units, for example.

Figure 3:
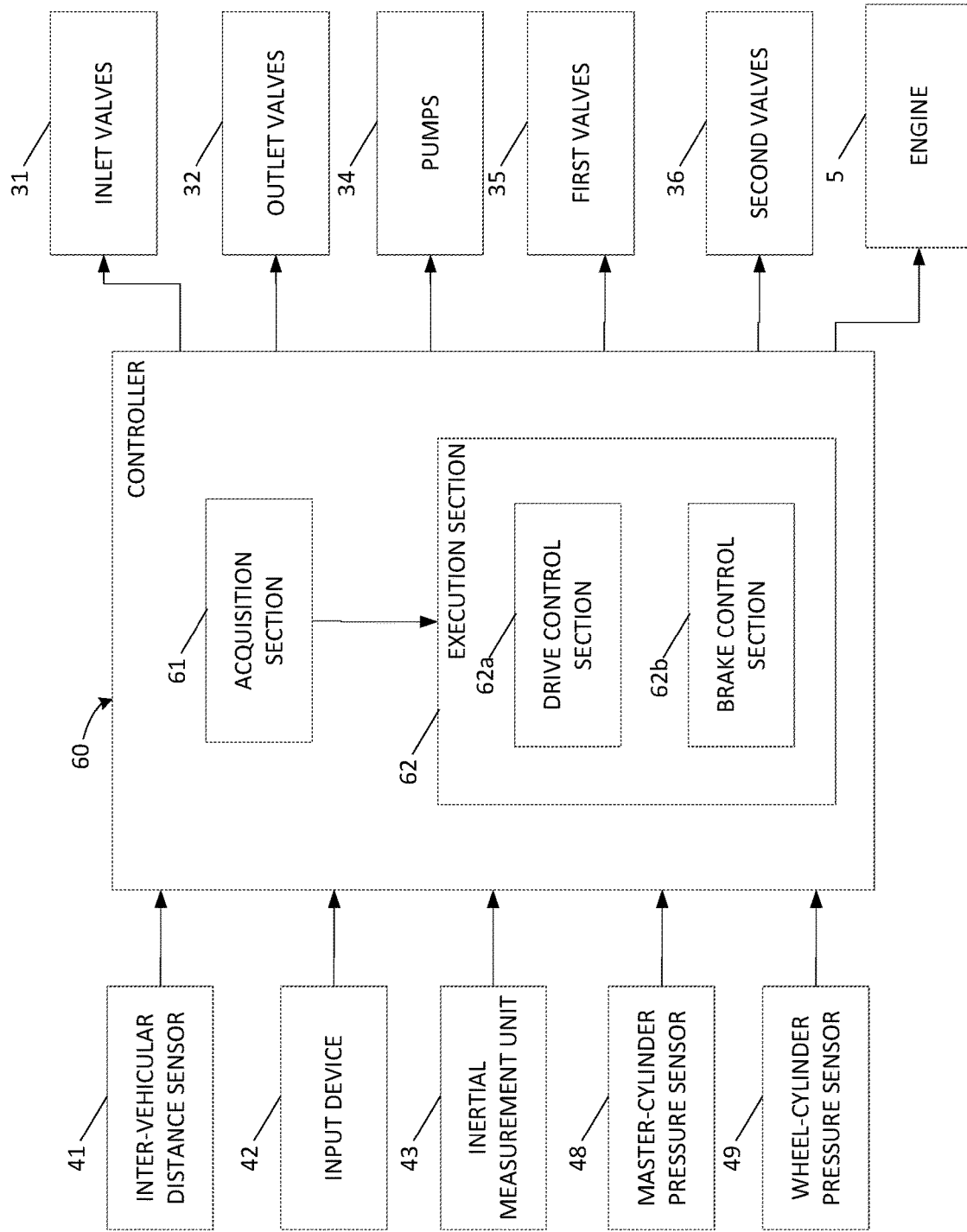
FIG. 3 is a block diagram of an exemplary functional configuration of the controller according to the embodiment of the present invention.

As illustrated in FIG. 3, the controller 60 includes an acquisition section 61 and an execution section 62, for example.

The acquisition section 61 acquires information that is output from each of the devices mounted to the motorcycle 100, and outputs the acquired information to the execution section 62. For example, the acquisition section 61 acquires the information output from the inter-vehicular distance sensor 41, the input device 42, the IMU 43, the master-cylinder pressure sensor 48, and the wheel-cylinder pressure sensor 49.

The execution section 62 controls operation of each of the devices mounted to the motorcycle 100, so as to control drive power and the braking force exerted on the motorcycle 100.

Here, by controlling the operation of each of the devices mounted to the motorcycle 100, the execution section 62 can execute the adaptive cruise control in which the motorcycle 100 is made to travel according to the distance from the motorcycle 100 to the preceding vehicle, the motion of the motorcycle 100, and the rider's instruction. More specifically, in the case where the rider selects the travel mode in which the adaptive cruise control is executed, the execution section 62 executes the adaptive cruise control. Note that, in the case where the rider performs an accelerator operation or a brake operation during the adaptive cruise control, the execution section 62 cancels the adaptive cruise control.

In the adaptive cruise control, the distance from the motorcycle 100 to the preceding vehicle is controlled to approximate a reference distance. As the distance from the motorcycle 100 to the preceding vehicle, the reference distance is set to a value with which the rider's safety can be secured. In the case where no preceding vehicle is recognized, a speed of the motorcycle 100 is controlled at a set speed, which is set in advance. In addition, in the adaptive cruise control, each of acceleration and deceleration of the motorcycle 100 is controlled to be equal to or lower than an upper limit value of such extent that does not worsen the rider's comfort.

More specifically, during the adaptive cruise control, the execution section 62 calculates a target value of the acceleration (hereinafter referred to as target acceleration) or a target value of the deceleration (hereinafter referred to as target deceleration) on the basis of a comparison result between the distance from the motorcycle 100 to the preceding vehicle and the reference distance and on the basis of a relative speed between the motorcycle 100 and the preceding vehicle. Then, based on a calculation result, the execution section 62 controls the drive power and the braking force exerted on the motorcycle 100. For example, in the case where the distance from the motorcycle 100 to the preceding vehicle is longer than the reference distance, the execution section 62 calculates the target acceleration that corresponds to a difference between the distance from the motorcycle 100 to the preceding vehicle and the reference distance. On the other hand, in the case where the distance from the motorcycle 100 to the preceding vehicle is shorter than the reference distance, the execution section 62 calculates the target deceleration that corresponds to the difference between the distance from the motorcycle 100 to the preceding vehicle and the reference distance.

The execution section 62 includes a drive control section 62a and a brake control section 62b, for example.

The drive control section 62a controls the drive power that is transmitted to the wheel of the motorcycle 100 during the adaptive cruise control. More specifically, during the adaptive cruise control, the drive control section 62a outputs a command to an engine control unit (not illustrated), which outputs a signal for controlling operation of each of the components of the engine 5 (the throttle valve, the fuel injector, the ignition plug, and the like). In this way, the drive control section 62a controls operation of the engine 5. Consequently, during the adaptive cruise control, the drive power, which is transmitted to the wheel, is controlled.

In the normal time, the operation of the engine 5 is controlled by the engine control unit such that the drive power is transmitted to the wheel in response to the rider's accelerator operation.

Meanwhile, during the adaptive cruise control, the drive control section 62a controls the operation of the engine 5 such that the drive power is transmitted to the wheel without relying on the rider's accelerator operation. More specifically, during the adaptive cruise control, the drive control section 62a controls the operation of the engine 5 such that the acceleration of the motorcycle 100 becomes the target acceleration, which is calculated on the basis of the distance from the motorcycle 100 to the preceding vehicle and the relative speed between the motorcycle 100 and the preceding vehicle. In this way, the drive control section 62a controls the drive power transmitted to the wheel.

The brake control section 62b controls the operation of each of the components of the hydraulic pressure control unit 50 of the brake system 10, so as to control the braking force generated on each of the wheels of the motorcycle 100.

In the normal time, as described above, the brake control section 62b controls the operation of each of the components of the hydraulic pressure control unit 50 such that the braking force is generated on each of the wheels in response to the rider's brake operation.

Meanwhile, during the adaptive cruise control, the brake control section 62b controls the operation of each of the components such that the braking force is generated on each of the wheels without relying on the rider's brake operation.

More specifically, during the adaptive cruise control, the brake control section 62b controls the operation of each of the components of the hydraulic pressure control unit 50 such that the deceleration of the motorcycle 100 becomes the target deceleration, which is calculated on the basis of the distance from the motorcycle 100 to the preceding vehicle and the relative speed between the motorcycle 100 and the preceding vehicle. In this way, the brake control section 62b controls the braking force generated on each of the wheels.

For example, during the adaptive cruise control, the brake control section 62b brings the motorcycle 100 into a state where the inlet valves 31 are opened, the outlet valves 32 are closed, the first valves 35 are closed, and the second valves 36 are opened, and drives the pumps 34 in such a state, so as to increase the hydraulic pressure of the brake fluid in each of the wheel cylinders 24 and generate the braking force on each of the wheels. In addition, the brake control section 62b adjusts the hydraulic pressure of the brake fluid in each of the wheel cylinders 24 by controlling an opening amount of the first valve 35, for example. In this way, the brake control section 62b can control the braking force generated on each of the wheels.

Here, during the adaptive cruise control, the brake control section 62b separately controls operation of each of the front-wheel brake mechanism 12 and the rear-wheel brake mechanism 14, so as to separately control the hydraulic pressure of the brake fluid in the wheel cylinder 24 of each of the front-wheel brake mechanism 12 and the rear-wheel brake mechanism 14. In this way, the brake control section 62b can control braking force distribution between the front and rear wheels (that is, distribution of the braking force generated on the front wheel 3 and the braking force generated on the rear wheel 4). More specifically, the brake control section 62b controls the braking force distribution between the front and rear wheels such that a total of target braking force values generated on the wheels becomes a requested braking force (that is, the braking force that is requested at the time of braking during the adaptive cruise control) corresponding to the target deceleration. The requested braking force is specifically the required braking force to bring the deceleration of the motorcycle 100 to the target deceleration, which is calculated on the basis of the distance from the motorcycle 100 to the preceding vehicle and the relative speed between the motorcycle 100 and the preceding vehicle.

In the case where at least one of the wheels is locked or possibly locked, the brake control section 62b may execute the anti-lock brake control. The anti-lock brake control is control for adjusting the braking force of the wheel, which is locked or possibly locked, to such a magnitude of the braking force with which locking of the wheel can be avoided.

For example, during the anti-lock brake control, the brake control section 62b brings the motorcycle 100 into a state where the inlet valves 31 are closed, the outlet valves 32 are opened, the first valves 35 are opened, and the second valves 36 are closed, and drives the pumps 34 in such a state, so as to reduce the hydraulic pressure of the brake fluid in each of the wheel cylinders 24 and reduce the braking force generated on each of the wheels. In addition, the brake control section 62b closes both of the inlet valves 31 and the outlet valves 32 from the above state, for example. In this way, the brake control section 62b can keep the hydraulic pressure of the brake fluid in each of the wheel cylinders 24, and thus can keep the braking force generated on each of the wheels. Furthermore, the brake control section 62b opens the inlet valves 31 and closes the outlet valves 32 from the above state, for example. In this way, the brake control section 62b can increase the hydraulic pressure of the brake fluid in each of the wheel cylinders 24, and thus can increase the braking force generated on each of the wheels.

As described above, in the controller 60, the execution section 62 can execute the adaptive cruise control. When the execution section 62 causes the generation of the braking forces on at least one of the wheels of the motorcycle 100 during the adaptive cruise control, at a braking start time point at which the braking force starts being generated on at least one of the wheels, the execution section 62 brings the braking force distribution between the front and rear wheels into an initial state where the braking force is generated on the front wheel 3. Then, with a lapse of time, the execution section 62 increases a distribution ratio for the rear wheel 4 in the braking force distribution. In this way, the adaptive cruise control of the motorcycle 100 is appropriately executed. A detailed description will be made below on processing related to wheel braking control during such adaptive cruise control executed by the controller 60.

The description has been made above on the example in which the drive control section 62a controls the operation of the engine 5 via the engine control unit. However, the drive control section 62a may output a signal for controlling the operation of each of the components of the engine 5, so as to directly control the operation of each of the components of the engine 5. In such a case, the drive control section 62a controls the operation of the engine 5 in the normal time in a similar manner to the operation of the engine 5 during the adaptive cruise control.

<Operation of Controller>

A description will be made on operation of the controller 60 according to the embodiment of the present invention with reference to FIG. 4.

Figure 4:
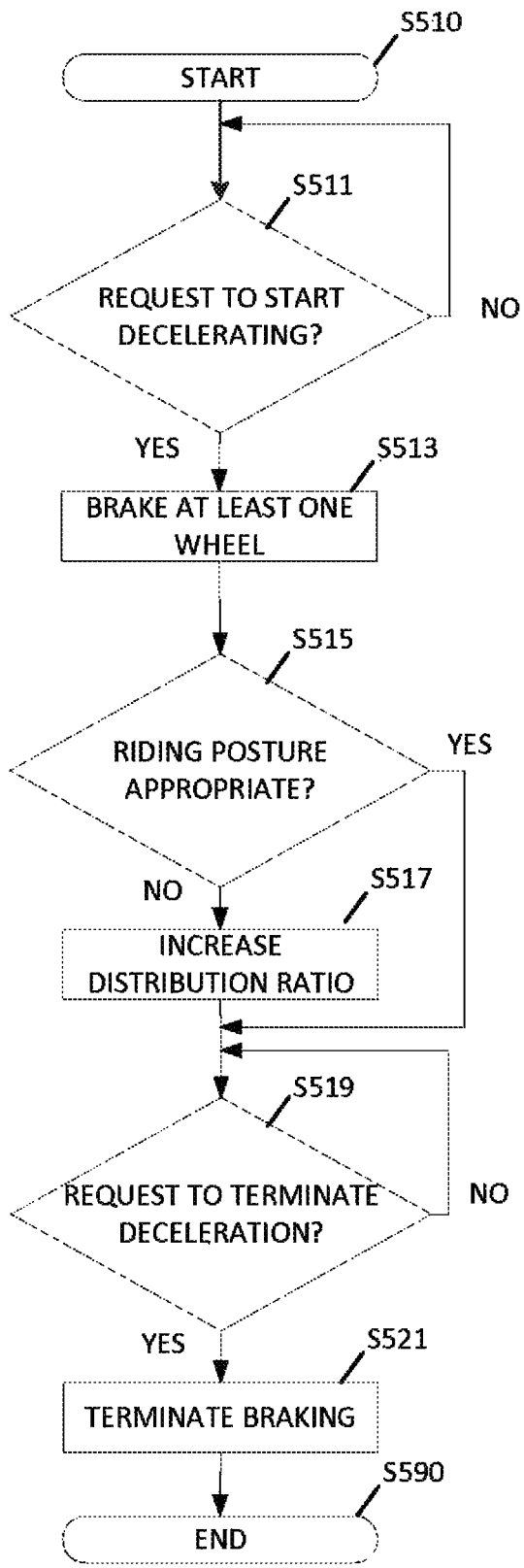
FIG. 4 is a flowchart of an exemplary processing procedure that is executed by the controller according to the embodiment of the present invention.

FIG. 4 is a flowchart of an exemplary processing procedure that is executed by the controller 60. More specifically, a control flow illustrated in FIG. 4 corresponds to a processing procedure related to wheel braking control during the adaptive cruise control, which is executed by the execution section 62 of the controller 60, and is repeatedly executed during the adaptive cruise control. In addition, step S510 and step S590 in FIG. 4 respectively correspond to initiation and termination of the control flow illustrated in FIG. 4.

When the control flow illustrated in FIG. 4 is initiated, in step S511, the execution section 62 determines whether a request to start decelerating the motorcycle 100 is made. If the execution section 62 determines that the request to start decelerating the motorcycle 100 is made (step S511/YES), the processing proceeds to step S513. On the other hand, if the execution section 62 determines that the request to start decelerating the motorcycle 100 is not made (step S511/NO), the determination processing in step S511 is repeated.

For example, in the case where it is determined, on the basis of the relative speed to the preceding vehicle, that there is a relatively high possibility that the distance to the preceding vehicle falls below the reference distance under a situation where the distance from the motorcycle 100 to the preceding vehicle is reduced from the longer distance than the reference distance, the execution section 62 determines that the request to start decelerating the motorcycle 100 is made.

If it is determined YES in step S511, in step S513, the brake control section 62b starts braking at least one of the wheels of the motorcycle 100. More specifically, during the braking of at least one of the wheels, as described above, the brake control section 62b controls the braking force generated on each of the wheels such that the deceleration of the motorcycle 100 becomes the target deceleration, which is calculated on the basis of the distance from the motorcycle 100 to the preceding vehicle and the relative speed between the motorcycle 100 and the preceding vehicle.

Here, at the braking start time point at which the braking force starts being generated on at least one of the wheels, the brake control section 62b brings the braking force distribution between the front and rear wheels into the initial state where the braking force is generated on the front wheel 3.

At the braking start time point, the braking force distribution is brought into the initial state where the braking force is generated on the front wheel 3. Thus, at the braking start time point, it is possible to prevent generation of the force remaining in the brake mechanism for the front wheel 3 that is more favorable for braking of the straddle-type vehicle than the brake mechanism for the rear wheel 4. In addition, from a perspective of further effectively preventing the generation of the force that remains in the brake mechanism for the front wheel 3 at the braking start time point, in the above initial state, the brake control section 62b preferably causes the braking force to be only generated on the front wheel 3. In addition, from a perspective of suppressing a forward tilt of the motorcycle 100 at the braking start time point, in the above initial state, the brake control section 62b preferably causes the braking force to be generated on the rear wheel 4 in addition to the front wheel 3.

Next, in step S515, the execution section 62 determines whether the rider's riding posture is appropriate as a posture during the deceleration. If the execution section 62 determines that the rider's riding posture is inappropriate as the posture during the deceleration (step S515/NO), the processing proceeds to step S517. On the other hand, if the execution section 62 determines that the rider's riding posture is appropriate as the posture during the deceleration (step S515/YES), the processing proceeds to step S519. More specifically, in the case where the execution section 62 determines that the rider's riding posture is inappropriate as the posture during the deceleration, the execution section 62 reduces the distribution ratio for the front wheel 3 in comparison with the case where the execution section 62 does not determine that the rider's riding posture is inappropriate. The execution section 62 may determine whether the rider's riding posture is appropriate as the posture during the deceleration prior to step S513. Then, at a time point at which the braking force distribution is brought into the initial state, the execution section 62 may reduce the distribution ratio for the front wheel 3.

More specifically, the riding posture that is inappropriate as the posture during the deceleration means such a posture that the rider is not ready for behavior of the motorcycle 100 during the deceleration and thus the rider possibly falls off the motorcycle 100.

For example, when determining that the rider does not grasp the handlebar 2, the execution section 62 determines that the rider's riding posture is inappropriate as the posture during the deceleration. The determination on whether the rider grasps the handlebar 2 can be made by using a proximity sensor that is provided to the handlebar 2, for example.

In addition, for example, when determining that the rider does not hold the trunk 1 between both of his/her legs, the execution section 62 determines that the rider's riding posture is inappropriate as the posture during the deceleration. The determination on whether the rider holds the trunk 1 between both of his/her legs can be made by using the proximity sensor provided to the trunk 1, for example.

In addition, for example, when determining that the rider's line of sight is not oriented to the front, the execution section 62 determines that the rider's riding posture is inappropriate as the posture during the deceleration. The determination on whether the rider's line of sight is oriented to the front can be made by using a device that captures an image of the rider's face and performs image processing on the acquired image to detect the rider's line of sight, for example.

If it is determined NO in step S515, in step S517, the brake control section 62b increases the distribution ratio for the rear wheel 4 in the braking force distribution between the front and rear wheels with the lapse of time.

In a process of increasing the distribution ratio for the rear wheel 4 in the braking force distribution between the front and rear wheels, as described above, the braking force distribution between the front and rear wheels is controlled such that the total of the target braking force values generated on the wheels becomes the requested braking force. Accordingly, for example, under a situation where the deceleration of the motorcycle 100 remains constant (that is, the requested braking force remains constant) for a specified period from the braking start time point, in such a specified period, the braking force generated on the rear wheel 4 is increased with the lapse of time while the braking force generated on the front wheel 3 is reduced with the lapse of time.

In the case where the braking force distribution is maintained in the initial state, the motorcycle 100 is more likely to be tilted forward in a manner that a rear portion of the motorcycle 100 is lifted. Thus, it is considered to change the braking force distribution from the initial state. However, in the case where the braking force distribution is abruptly changed at this time, pitching of the motorcycle 100 is likely to occur. To handle such a problem, as described above, after the braking force distribution is brought into the initial state, the distribution ratio for the rear wheel 4 is increased with the lapse of time. In this way, it is possible to suppress the forward tilt of the motorcycle 100 while suppressing occurrence of the pitching that is caused by the abrupt change in the braking force distribution.

Here, from a perspective of further stabilizing the posture of the motorcycle 100 after the braking force distribution is brought into the initial state, the brake control section 62b preferably brings the braking force distribution into the initial state, and thereafter preferably controls the braking force distribution between the front and rear wheels on the basis of information on the behavior of the motorcycle 100.

For example, after bringing the braking force distribution into the initial state, the brake control section 62b may control a change rate of the braking force distribution on the basis of a pitch angle of the motorcycle 100. For example, in the case where the pitch angle is large, the brake control section 62b may increase the change rate of the braking force distribution to be higher than the change rate of the braking force distribution at the time when the pitch angle is small. Alternatively, for example, in the case where a change rate of the pitch angle is high, the brake control section 62b may increase the change rate of the braking force distribution to be higher than the change rate of the braking force distribution at the time when the change rate of the pitch angle is low.

After bringing the braking force distribution into the initial state, the brake control section 62b may control the change rate of the braking force distribution on the basis of a slip degree of the front wheel 3 of the motorcycle 100. For example, the slip degree may be defined as a ratio (a slip rate) of a rotational frequency of the front wheel 3 to a body speed of the motorcycle 100, or may be defined by another physical quantity that is substantially equivalent to such a ratio. Calculation of the slip degree of the front wheel 3 is well known. Thus, a description thereon will not be made. For example, in the case where the slip degree of the front wheel 3 is large, the brake control section 62b may increase the change rate of the braking force distribution to be higher than the change rate of the braking force distribution at the time when the slip degree of the front wheel 3 is small. Alternatively, for example, in the case where a change rate of the slip degree of the front wheel 3 is high, the brake control section 62b may increase the change rate of the braking force distribution to be higher than the change rate of the braking force distribution at the time when the change rate of the slip degree of the front wheel 3 is low.

After bringing the braking force distribution into the initial state, the brake control section 62b may control the change rate of the braking force distribution on the basis of a slip degree of the rear wheel 4 of the motorcycle 100. For example, the slip degree may be defined as a ratio (a slip rate) of a rotational frequency of the rear wheel 4 to the body speed of the motorcycle 100, or may be defined by another physical quantity that is substantially equivalent to such a ratio. Calculation of the slip degree of the rear wheel 4 is well known. Thus, a description thereon will not be made. For example, in the case where the slip degree of the rear wheel 4 is large, the brake control section 62b may reduce the change rate of the braking force distribution to be lower than the change rate of the braking force distribution at the time when the slip degree of the rear wheel 4 is small. Alternatively, for example, in the case where a change rate of the slip degree of the rear wheel 4 is high, the brake control section 62b may reduce the change rate of the braking force distribution to be lower than the change rate of the braking force distribution at the time when the change rate of the slip degree of the rear wheel 4 is low.

In addition, after bringing the braking force distribution into the initial state, the brake control section 62b may control an increase start time point, at which the distribution ratio for the rear wheel 4 in the braking force distribution starts being increased, on the basis of the pitch angle of the motorcycle 100. For example, the brake control section 62b may determine a time point, at which the pitch angle exceeds a reference value, as the increase start time point. Then, at such an increase start time point, the brake control section 62b may start increasing the distribution ratio for the rear wheel 4 in the braking force distribution. Alternatively, for example, the brake control section 62b may determine a time point, at which the change rate of the pitch angle exceeds a reference value, as the increase start time point. Then, at such an increase start time point, the brake control section 62b may start increasing the distribution ratio for the rear wheel 4 in the braking force distribution.

After bringing the braking force distribution into the initial state, the brake control section 62b may control the increase start time point, at which the distribution ratio for the rear wheel 4 in the braking force distribution starts being increased, on the basis of the slip degree of the front wheel 3 of the motorcycle 100. For example, the brake control section 62b may determine a time point, at which the slip degree of the front wheel 3 exceeds a reference value, as the increase start time point. Then, at such an increase start time point, the brake control section 62b may start increasing the distribution ratio for the rear wheel 4 in the braking force distribution. Such a reference value may correspond to a limit slip degree with which locking or possible locking of the front wheel 3 does not occur, or may correspond to the slip degree that is smaller than the limit slip degree. For example, the brake control section 62b may determine a time point, at which the change rate of the slip degree of the front wheel 3 exceeds a reference value, as the increase start time point. Then, at such an increase start time point, the brake control section 62b may start increasing the distribution ratio for the rear wheel 4 in the braking force distribution.

The brake control section 62b may set a time point, at which the target deceleration calculated on the basis of a difference between the distance from the motorcycle 100 to the preceding vehicle at that time point and the reference distance exceeds a reference value, as the increase start time point, at which the distribution ratio for the rear wheel 4 in the braking force distribution starts being increased, or may set a time point, at which a period determined according to a magnitude of the target deceleration used in step S513 elapses from the braking start time point, as the increase start time point. In the case where the target deceleration is high, such a period may be set shorter than the period at the time when the target deceleration is low. Alternatively, the brake control section 62b may set a time point, at which body deceleration generated to the motorcycle 100 exceeds a reference value, as the increase start time point, at which the distribution ratio for the rear wheel 4 in the braking force distribution starts being increased.

The brake control section 62b may set a time point, at which an elapsed time from the braking start time point exceeds a reference value set in advance as a fixed value, as the increase start time point, at which the distribution ratio for the rear wheel 4 in the braking force distribution starts being increased.

A mode of increasing the distribution ratio for the rear wheel 4 in the braking force distribution, which is conducted after the braking force distribution is brought into the initial state, only needs to be the increase with the lapse of time, and thus is not particularly limited. For example, the brake control section 62b may increase the distribution ratio for the rear wheel 4 stepwise with the lapse of time. Alternatively, for example, the brake control section 62b may increase the distribution ratio for the rear wheel 4 continuously with the lapse of time. For example, the brake control section 62b may increase the distribution ratio for the rear wheel 4 such that a transition average of the distribution ratio for the rear wheel 4 in the braking force distribution is increased with the lapse of time. That is, the brake control section 62b may change the distribution ratio for the rear wheel 4 in the braking force distribution such that the distribution ratio for the rear wheel 4 is increased while being accompanied with a temporary reduction.

After step S517, or in the case where it is determined YES in step S515, in step S519, the execution section 62 determines whether a request to terminate the deceleration of the motorcycle 100 is made. If the execution section 62 determines that the request to terminate the deceleration of the motorcycle 100 is made (step S519/YES), the processing proceeds to step S521. On the other hand, if the execution section 62 determines that the request to terminate the deceleration of the motorcycle 100 is not made (step S519/NO), the determination processing in step S519 is repeated.

For example, when the distance from the motorcycle 100 to the preceding vehicle is increased from the shorter distance than the reference distance and then exceeds the reference distance, the execution section 62 determines that the request to terminate the deceleration of the motorcycle 100 is made.

If it is determined YES in step S519, in step S521, the brake control section 62b terminates braking of the wheels of the motorcycle 100.

Next, the control flow illustrated in FIG. 4 is terminated.

Also, in the case where the request to terminate the deceleration of the motorcycle 100 is made in the middle of the processing to increase the distribution ratio for the rear wheel 4 in the braking force distribution (that is, the processing in step S517), the brake control section 62b terminates braking of the wheels. Then, the control flow illustrated in FIG. 4 is terminated.

As described above, in the control flow illustrated in FIG. 4, when determining that the rider's riding posture is appropriate as the posture during the deceleration, the execution section 62 prohibits the distribution ratio for the rear wheel 4 from being increased with the lapse of time after the braking force distribution between the front and rear wheels is brought into the initial state. The controller 60 may not make the determination in step S515, that is, may control the braking force distribution between the front and rear wheels regardless of the rider's riding posture.

<Effects of Controller>

A description will be made on effects of the controller 60 according to the embodiment of the present invention.

When the execution section 62 in the controller 60 causes the generation of the braking forces on at least one of the wheels of the motorcycle 100 during the adaptive cruise control, at the braking start time point, at which the braking force starts being generated on at least one of the wheels, the execution section 62 brings the braking force distribution between the front and rear wheels into the initial state where the braking force is generated on the front wheel 3. As a result, at the braking start time point, it is possible to prevent the generation of the force remaining in the brake mechanism for the front wheel (the front-wheel brake mechanism 12) that is more favorable for braking of the straddle-type vehicle than the brake mechanism for the rear wheel (the rear-wheel brake mechanism 14). Therefore, the adaptive cruise control of the motorcycle 100 can appropriately be executed.

Preferably, in the controller 60, the execution section 62 causes the braking force to be generated only on the front wheel 3 in the initial state. In this way, it is possible to further effectively suppress the generation of the force remaining in the brake mechanism for the front wheel 3 at the braking start time point.

Preferably, in the controller 60, in the initial state, the execution section 62 causes the braking force to be generated on the rear wheel 4 in addition to the front wheel 3. In this way, it is possible to suppress the forward tilt of the motorcycle 100 at the braking start time point.

Preferably, in the controller 60, when causing the braking force to be generated on at least one of the wheels during the adaptive cruise control, the execution section 62 brings the braking force distribution into the initial state at the braking start time point, and then increases the distribution ratio for the rear wheel 4 in the braking force distribution with the lapse of time. In this way, it is possible to suppress the forward tilt of the motorcycle 100 while suppressing the occurrence of the pitching that is caused by the abrupt change in the braking force distribution.

Preferably, in the controller 60, after bringing the braking force distribution into the initial state, the execution section 62 controls the braking force distribution on the basis of the information on the behavior of the motorcycle 100. For example, the information on the behavior includes the slip degree of at least one of the wheels (the front wheel 3 and the rear wheel 4), the target deceleration in the adaptive cruise control, the body deceleration generated to the motorcycle 100, the pitch angle of the motorcycle 100, and the like. In this way, it is possible to appropriately suppress unstable body behavior that is caused by bringing the braking force distribution into the initial state. As a result, it is possible to further stabilize the posture of the motorcycle 100 after the braking force distribution is brought into the initial state. Therefore, the rider's comfort can further appropriately be secured.

Preferably, in the controller 60, after bringing the braking force distribution into the initial state, the execution section 62 controls the change rate of the braking force distribution on the basis of the information on the behavior of the motorcycle 100. In this way, it is possible to further appropriately suppress the unstable body behavior that is caused by bringing the braking force distribution into the initial state. As a result, it is possible to further effectively stabilize the posture of the motorcycle 100 after the braking force distribution is brought into the initial state. Therefore, the rider's comfort can further appropriately be secured.

Preferably, in the controller 60, after bringing the braking force distribution into the initial state, the execution section 62 controls the increase start time point, at which the distribution ratio for the rear wheel 4 in the braking force distribution starts being increased, on the basis of the information on the behavior of the motorcycle 100. In this way, it is possible to further appropriately suppress the unstable body behavior that is caused by bringing the braking force distribution into the initial state. As a result, it is possible to further effectively stabilize the posture of the motorcycle 100 after the braking force distribution is brought into the initial state. Therefore, the rider's comfort can further appropriately be secured.

Preferably, in the controller 60, in the case where the execution section 62 determines that the rider's riding posture is inappropriate as the posture during the deceleration at the time point at which the braking force distribution is brought into the initial state or after the braking force distribution is brought into the initial state, the execution section 62 reduces the distribution ratio for the front wheel 3 in comparison with the case where the execution section 62 does not determine that the rider's riding posture is inappropriate. In this way, it is possible to suppress the motorcycle 100 from being tilted forward at a time point at which the rider is not ready for the behavior of the motorcycle 100 during the deceleration. Therefore, the rider's safety can further appropriately be secured.

The present invention is not limited to the embodiment that has been described. For example, only a part of the embodiment may be implemented, or parts of the embodiment may be combined.

REFERENCE SIGNS LIST

1: Trunk
2: Handlebar
3: Front wheel
3a: Rotor
4: Rear wheel
4a: Rotor
5: Engine
10: Brake system
11: First brake operation section
12: Front-wheel brake mechanism
13: Second brake operation section
14: Rear-wheel brake mechanism
21: Master cylinder
22: Reservoir
23: Brake caliper
24: Wheel cylinder
25: Primary channel
26: Secondary channel
27: Supply channel
31: Inlet valve
32: Outlet valve
33: Accumulator
34: Pump
35: First valve
36: Second valve
41: Inter-vehicular distance sensor
42: Input device
43: Inertial measurement unit
48: Master-cylinder pressure sensor
49: Wheel-cylinder pressure sensor
50: Hydraulic pressure control unit
51: Base body
60: Controller
61: Acquisition section
62: Execution section
62a: Drive control section
62b: Brake control section
100: Motorcycle

The invention claimed is:

1. A controller (60) that controls travel of a straddle-type vehicle (100), the controller configured to:
   execute adaptive cruise control in which the straddle-type vehicle (100) is made to travel according to a distance from said straddle-type vehicle (100) to a preceding vehicle, motion of said straddle-type vehicle (100), and a rider's instruction, wherein
   when the controller causes generation of braking forces on at least one of wheels (3, 4) of the straddle-type vehicle (100) during the adaptive cruise control, at a braking start time point, at which the braking force starts being generated on at least one of the wheels (3, 4), the controller brings braking force distribution between a front wheel and a rear wheel into an initial state where the braking force is generated on the front wheel (3), and
   when causing the braking force to be generated on at least one of the wheels (3, 4) during the adaptive cruise control, the controller brings the braking force distribution into the initial state at the braking start time point, and then increases a distribution ratio for the rear wheel (4) in the braking force distribution with a lapse of time.

2. The controller according to claim 1, wherein in the initial state, the controller is further configured to cause the braking force to be generated only on the front wheel (3).

3. The controller according to claim 1, wherein in the initial state, the controller is further configured to cause the braking force to be generated on the rear wheel (4) in addition to the front wheel (3).

4. The controller according to claim 1, wherein the controller brings the braking force distribution into the initial state, and thereafter controls the braking force distribution on the basis of information on behavior of the straddle-type vehicle (100).

5. The controller according to claim 4, wherein the controller brings the braking force distribution into the initial state, and thereafter controls a change rate of the braking force distribution on the basis of the information on the behavior of the straddle-type vehicle (100).

6. The controller according to claim 4, wherein the controller brings the braking force distribution into the initial state, and thereafter controls an increase start time point, at which the distribution ratio for the rear wheel (4) starts being increased, on the basis of the information on the behavior of the straddle-type vehicle (100).

7. The controller according to claim 4, wherein the information on the behavior includes information on a slip degree generated to at least one of the wheels (3, 4).

8. The controller according to claim 4, wherein the information on the behavior includes information on target deceleration in the adaptive cruise control.

9. The controller according to claim 4, wherein the information on the behavior includes information on body deceleration of the straddle-type vehicle (100).

10. The controller according to claim 4, wherein the information on the behavior includes information on a pitch angle of the straddle-type vehicle (100).

11. The controller according to claim 1, wherein in the case where the controller determines that a rider's riding posture is inappropriate as a posture during deceleration at a time point at which the braking force distribution is brought into the initial state or after the braking force distribution is brought into the initial state, the controller reduces a distribution ratio for the front wheel (3) in comparison with the case where the controller does not determine that the rider's riding posture is inappropriate.

12. A control method for controlling travel of a straddle-type vehicle (100), the control method comprising:

causing, then via a controller (60), generation of braking forces on at least one of wheels (3, 4) of the straddle-type vehicle (100) during adaptive cruise control, in which the straddle-type vehicle (100) is made to travel according to a distance from said straddle-type vehicle (100) to a preceding vehicle, motion of said straddle-type vehicle (100), and a rider's instruction, and at a braking start time point at which the braking force starts being generated on at least one of the wheels (3, 4), bringing braking force distribution between a front wheel and a rear wheel into an initial state where the braking force is generated on the front wheel (3), and wherein, when causing the braking force to be generated on at least one of the wheels (3, 4) during the adaptive cruise control, the controller brings the braking force distribution into the initial state at the braking start time point and then increases a distribution ratio for the rear wheel (4) in the braking force distribution with a lapse of time.

* * * * *